Nov. 4, 1930.                 W. E. KAY                    1,780,680
                           CUTTING MACHINE
                          Filed Oct. 12, 1922         5 Sheets-Sheet 4

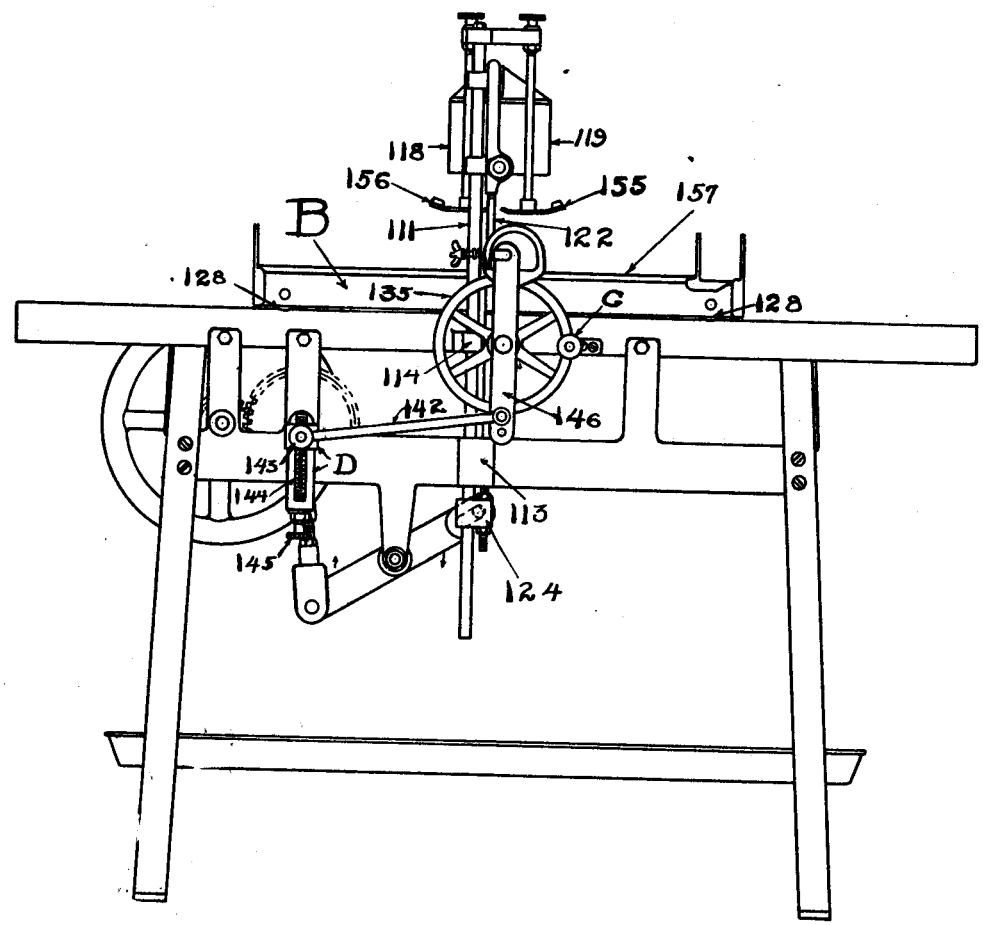

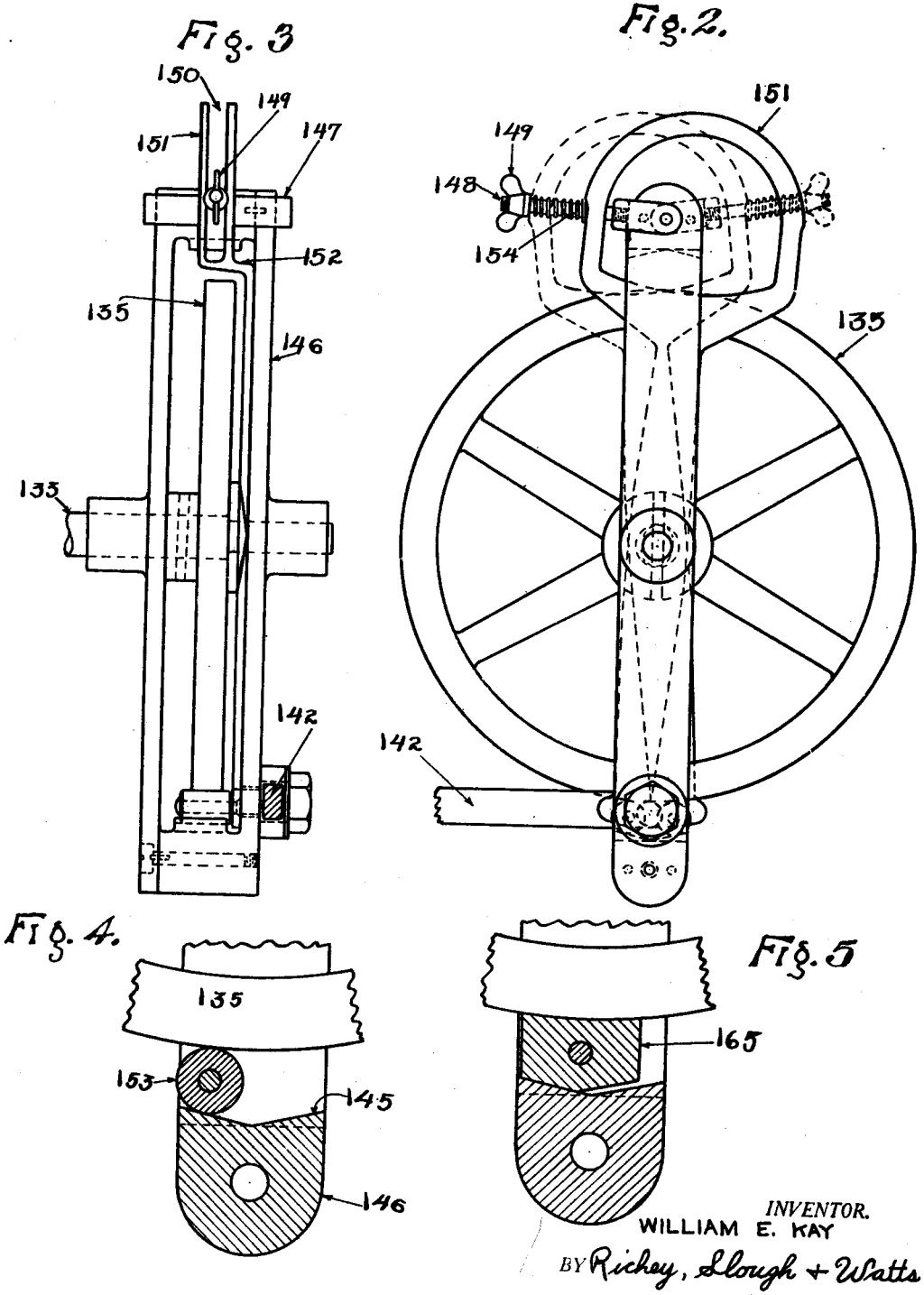

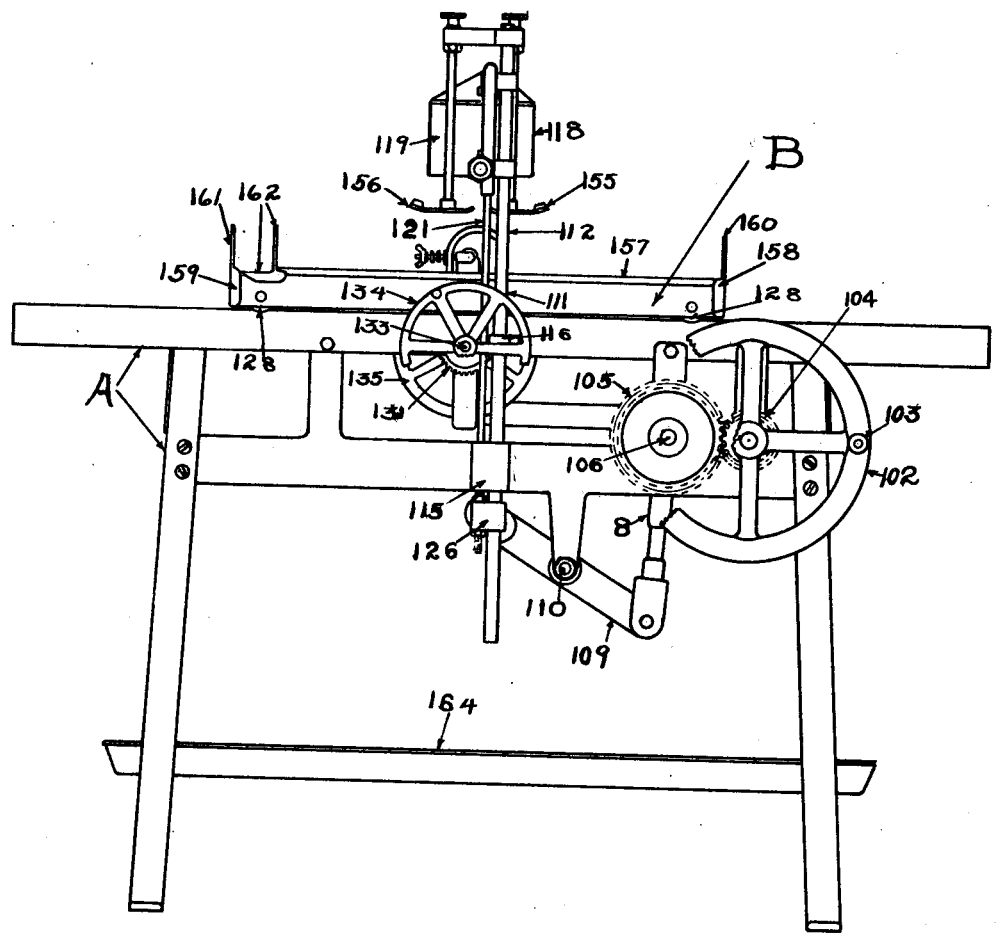

WILLIAM E. KAY   INVENTOR.

BY Richey, Slough & Watts

HIS ATTORNEYS

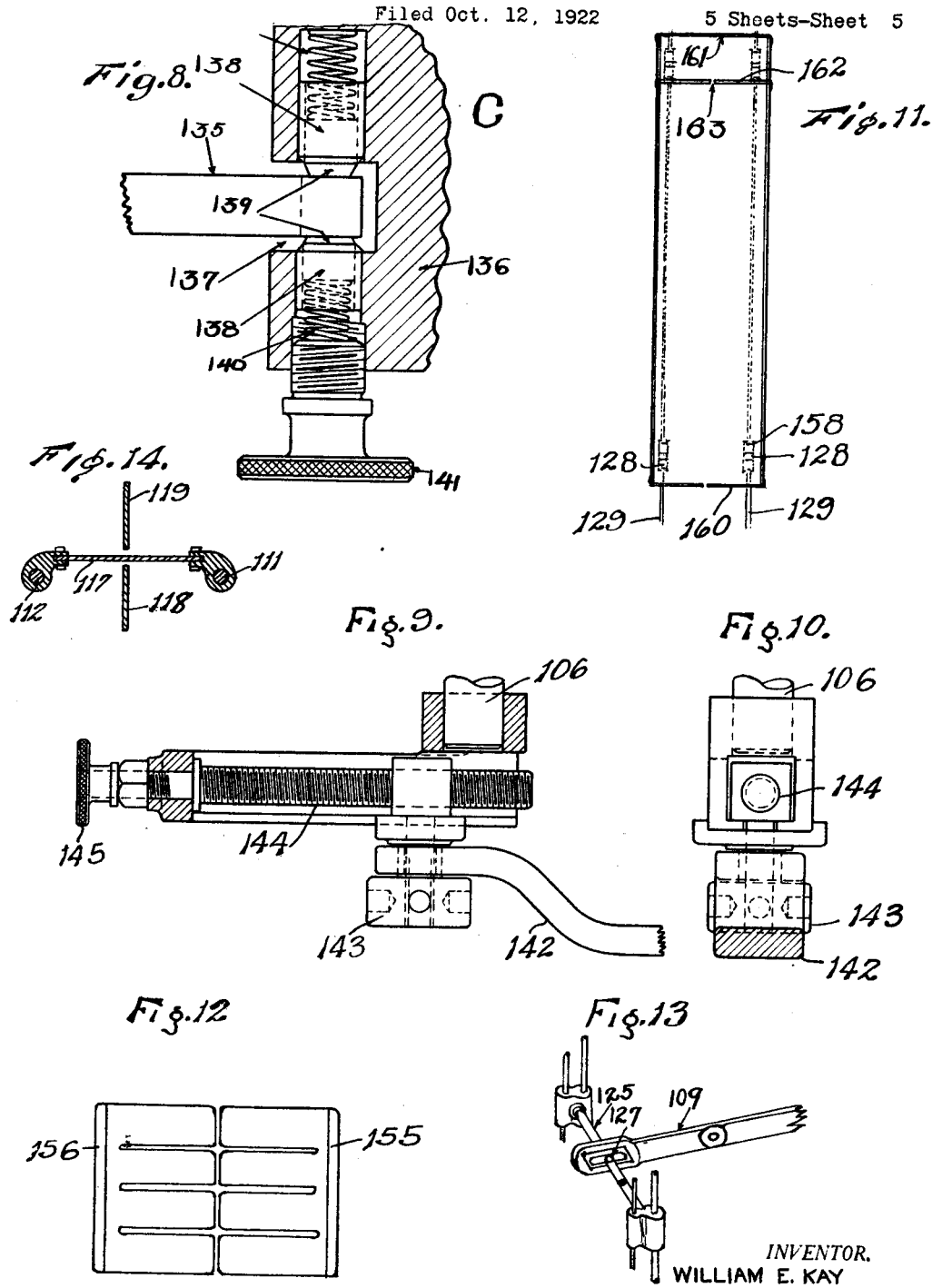

Patented Nov. 4, 1930

1,780,680

UNITED STATES PATENT OFFICE

WILLIAM E. KAY, OF ELYRIA, OHIO

CUTTING MACHINE

Application filed October 12, 1922. Serial No. 593,983.

My invention relates to cutting machines. More particularly, the machine of my invention is especially adapted for use in cutting ice cream products, vegetables, cheese, or the like, although it is not limited for the cutting of any particular kind or nature of material.

One of the objects of my invention is to provide a carriage on which the cutting operations are performed, the steps of which can be varied indefinitely; that is, the steps between each cut can be made either short or long, there being provided means for adjusting the length of the step.

Another object of my invention is to provide a carriage in a machine, the length of the steps of which may be varied as above indicated, and on which a cutting board is carried as a separate unit, and which board carries no part of the stepping mechanism; also in which, when the material is cut, the board may be removed with the cutting material thereon and a new board, with additional material to be cut, substituted therefor. With the mechanism which I provide, the material on a single board may be cut so that a portion of the sections cut may be of one length, whereupon the stepping mechanism may be adjusted to produce steps of different length, thereby enabling the machine to cut sections of the material of different length, on the same board.

It will be seen that this arrangement is economical both in labor and material inasmuch as all the boards in stock may be used for any and all cutting operations, whereas with the machines in the art only those boards in stock may be used that can cut material of the length desired at a particular time.

Another object of my invention is to provide a plurality of removable machine operated knives in parallel for stripping the material into a plurality of lengthwise sections.

Another object of my invention is to provide in combination with a plurality of lengthwise knives, a knife at right angles to the parallel knives, the whole set being machine operated for simultaneously cutting the material into a series of longitudinal strips and cutting the series of longitudinal strips into transverse sections.

Another object of my invention is to provide means for adjusting the height of the knives with respect to the cutting board.

Another object of my invention is to provide means for disengaging the feed mechanism from the carriage, whereby the carriage may be adjusted with respect to the knives to begin cutting at any predetermined point on the cutting board, and for thereafter throwing in the feed mechanism into engagement with the carriage. With this provision, I am enabled to utilize the whole length of the material to be cut without wasting the first cut.

Another object of my invention is to provide a track on which the carriage slides back and forth, and to provide wheels on which the carriage may roll.

Another object of my invention is to provide other features of improvement tending to increase the efficiency and serviceability of a device of the above character.

To accomplish the foregoing and other useful ends, my invention is provided with means hereinafter more fully set forth and claimed.

Fig. 1 is an embodiment of my invention showing a rear elevation from the side of the feeding mechanism.

Fig. 2 is an enlarged view of a section of the feed and stepping mechanism, referred to in connection with Fig. 1.

Fig. 3 is a side elevational view of Fig. 2.

Fig. 4 is an enlarged view of a section of the clutch referred to in connection with Fig. 1.

Fig. 5 is a modification of the clutch of Fig. 4.

Fig. 6 is a front elevational view of Fig. 1 with the rim of the driving wheel broken away to more clearly show the connection of the gears and construction, and with a section of the handwheel for adjusting the carriage broken away to enable the details in the rear thereof to be more clearly illustrated.

Fig. 8 is an enlarged detail of the brake for controlling the wheel of the feed and stepping mechanism of Fig. 2, the brake being applied on the right side of the wheel of Fig. 1.

Fig. 9 is an enlarged detail of the adjusting mechanism comprising part of the feed mechanism, Fig. 1.

Fig. 10 is an end view of the same, Fig. 2, viewed from right to left.

Fig. 11 is a top view of the carriage with the cutting board in place.

Fig. 12 is a bottom plan view of the scraping mechanism.

Fig. 13 is a detail of a section of the rocker arm and knife reciprocating mechanism.

Fig. 14 is a sectional plan view of the cutter blades.

Figure 7:
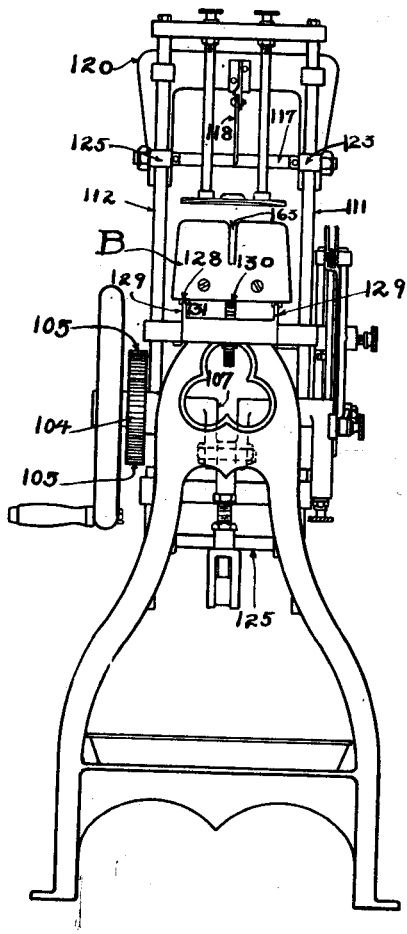
Fig. 7 is an end elevational view of Fig. 1, the feed and stepping mechanism being indicated on the right, and the driving wheel being indicated on the left.

Referring in detail to the accompanying drawings of my embodiment, the cutting machine is assembled about a frame work, A. At the right, I provide a wheel 102 to which there is attached a handle 103. This wheel is mounted on a shaft that extends across the frame, which shaft is journalled in suitable bearings. Just behind the wheel, 102, and on the same shaft therewith, I provide a pinion 104. This pinion is shown meshing with a gear, 105, which latter is mounted on a shaft 106, which is suitably journalled in the frame. This shaft 106 is provided with a crank-arm 107 to which the upper end of link 108 is journalled. The lower end of link 108 is pivotally connected to the rocker arm 109, the latter being pivoted on the shaft, 110.

On either side of the framework, I provide rods 111 and 112 which are secured and stationary to the frame work as follows,— the rod, 111, is secured at the points 113 and 114 and the rod, 112 is secured at the points 115 and 116. Mounted to slide on these rods up and down, are the cutting knives 117, 118 and 119. These knives are secured to the yoke 120 which latter is mounted on the upper ends of the rods 121 and 122 which rods in turn are mounted to slide up and down on the rods 111 and 112, the bearings 123, 124, 125 and 126 serving for that purpose. There is a yoke rod, 125, Fig. 14, connecting the two lower terminals of the rods 121 and 122. This yoke rod, 125, passes through the elongated opening 127 serving as a bearing between the rod 125 and the rocker-arm 109.

It will be seen, therefore, that upon turning the wheel 102, the gears 104 and 105 will be rotated with the result that the crank-arm on the shaft 106 will cause the rocker-arm 109 to rock about the shaft 110. This will, of course, cause the knives and the whole structure, which we may term the knife carriage, to reciprocate on the bearing rods 111 and 112, the rods 121 and 122 of the knife carriage sliding up and down. The bearings 123, 124, 125, and 126 slide, as explained, on the rods, 111 and 112. On the top of the frame work A, is the carriage B, which is provided with wheels 128 that roll on the tracks 129, Fig. 7, of the frame A.

Underneath of the carriage B, and lengthwise thereof, and centrally located, I provide a rack 130. Engaging with this rack is the pinion 131, Figs. 7 and 6, which pinion is mounted on the shaft, 133. In the front part of the machine, Fig. 6, the handwheel 134 is also mounted on the same shaft 133. On the rear side of the machine, there is also mounted a wheel, 135, on the same shaft 133. By rotating the handwheel, 134, the carriage B may be caused to move back and forth on the track 139 so that the carriage may be adjusted with respect to the knives when the cutting has begun. It is obvious that by rotating the wheel, 135, Fig. 1, which may be called for convenience, the stepping wheel, the carriage B may also be moved back and forth. If the wheel is rotated clock-wise, Fig. 1, the carriage will travel to the right. If rotated counter-clockwise, the carriage will travel to the left.

For purposes hereinafter more fully to appear, I provide in connection with the wheel 135 a brake mechanism C, Figs. 1 and 8. This brake is formed by a metal block 136 suitably secured to the frame, A, as indicated in Fig. 1. On the side adjacent the wheel 135 I provide a slot 137 into which the periphery of the wheel 135 projects. In suitable cavities on either side of the wheel 135 in the block 136, I provide brake shoes 138 each of these shoes being made of a steel tube into the forward end of which I drive a piece of hardwood 139. This wood may be oak, lignum-vitæ, or any other hardwood. Behind the shoes 138 I provide suitable springs 140 as shown in Fig. 8, to maintain the shoes pressed against the rim of the wheel 135 as shown. On the outer side of the block 136 I provide an adjusting screw 141 for regulating the tension in the springs 140.

On the shaft 106, see Fig. 1, on the side of the machine with the wheel 135, I provide an adjustable eccentric D, through the medium of which the link 142 is caused to reciprocate. This eccentric, which is of the usual and well known construction, is provided with a nut, 143, which may be slid along the screw, 144, by turning the head 145. Therefore, the nut, 143, may be moved toward or away from the axis of rotation of the shaft, 106, and thereby vary the length of the stroke of the arm 142. The right-hand end of the arm 142, Fig. 1 is screwed to the lower end of a rocker-arm, 146, see Figs. 2 and 3. This rocker-arm 146 is pivoted to the shaft 133 on which the wheel 134 is mounted. On the upper portion of the rocker arm 146, Fig. 3, I provide a stirrup 147 on which there is screwed a bolt 148 on the end of which I provide a thumb nut 149. This bolt 148 projects through a slot 150 in a second stirrup 151 on the upper end of the lever 152 on the lower end of which latter, there is mounted a roller 153 which roller is located between the inner surface 154 of the rocker-arm 146, see Fig. 4, and the arm of the wheel 134. It is obvious that this roller, rocker-arm, and wheel, constitute a cam clutching device, by means of which the wheel 134 may be rotated by reciprocating the rocker-arm 146. In the position of the roller, 153, Fig. 4, it will be seen that by reciprocating the rocker-arm 146, the wheel 134 will be caused to advance step by step to the right, that is, the wheel 134 will be caused to rotate in a counter-clockwise direction.

Referring to Fig. 2, it will be seen that the stirrup, 151 is controlled by the bolt 148, there being provided a spring 154 between the nut 149 and the rim of the stirrup. Obviously, by throwing the bolt, 148 to the left, as shown in Fig. 2, the stirrup 151 will be thrust to the right as indicated by the full lines in Fig. 2, which will cause the roller 153 to be thrust to the left, that is to the position indicated in Fig. 4. The position of the bolt at the left, as shown in Fig. 2, will cause the wheel 134 to be rotated in a counter-clockwise direction by reciprocating the arm 142. Reversing the bolt 148 as shown in dotted lines in Fig. 2, will reverse the stirrup 151 to the position indicated by dotted lines in Fig. 2, with a result that the roller 153 will be thrown to the opposite side as indicated in dotted lines in Fig. 4.

The object of the brake C is to provide sufficient friction to the wheel 135 so that it will not rotate too easily, otherwise the wheel 135 would have a tendency to reciprocate with the arm 146. In other words, the wheel 135 must have enough friction to enable the roller 153 to disengage from the rim of the wheel 135 on the return stroke, that is, on the stroke to the left, Fig. 4, to disengage from the wheel 135, without bringing the wheel back, otherwise, the wheel 135 would not retain the full forward step imparted to it by the stroke to the right of the roller 153, Fig. 4.

Therefore, with a construction and arrangement so far described and with the assumption that the roller 153, of the friction clutch arrangement, Fig. 4, for embodying the step by step motion to the carriage B, is in the position shown in Fig. 4, that is, to the left and which would also be to the left in Fig. 1, the operation of the machine would be as follows:—

Rotating the wheel 102 in a clockwise direction, Fig. 1, would rotate the shaft 106 in a counter-clockwise direction, consequently, the rotation of the crank arm 107, Fig. 7, on this shaft and of the adjusting mechanism D, on the same shaft would be counter-clockwise. It will be seen that the knives 117, 118 and 119 will reciprocate up and down above the carriage B, in such a manner that during the rotation of the crank arm 107, as the crank arm 107 sweeps over the upper half of its arc of rotation, the knives will be carried through the cycle of operation which corresponds with the descent of the knives as the crank arm 107 rises along the first 90° of the arc of rotation and during the succeeding 90° of the arc of rotation the knives will rise. The descent and the rising operation of the knives constitute one-half of the cycle of operation of the knives. It is during this one-half cycle of operation that the knives are in engagement with the material to be cut. They are in engagement with a material, either during the whole or a portion of this half of the cycle of operation. Associated with the knives, I provide a scraping device for scraping the material from the knives as the knives rise. This scraping device as shown in the drawing is made up of two plate sections, 155 and 156, see Fig. 1. The cross-knife passes in between the sections 155 and 156. The longitudinal knife passes through slots in the plates 155 and 156.

It will be understood that when I use two or more longitudinal knives, there are provided two or more longitudinal slots, one slot for each longitudinal knife. The cycle of operation of the knives that has just been described above and which corresponds to the rotation of the arm 107, along the upper arc of its circle of rotation is the cycle of operation which carries the knives below the plates 155 and 156. It is obvious that during this cycle of operation of the knives the carriage B should not move because it is during this time that the cutting operation is taking place.

Therefore, it is during this cycle of operation that the arm 142, Fig. 1, of the feed mechanism is traveling toward the left. While this arm is traveling to the left the roller 153 of the clutch arrangement Fig. 4 is sliding to the left and slipping with respect to the wheel 135; the friction clutch C preventing the wheel 135 from rotating in clockwise direction. It is during this time, that is, while the roller 153 is sliding over the rim of the wheel 135, that the knives are performing their cutting operation upon the material on the carriage B. As the rotation of the shaft 106 continues, the motion of the arm 142 is reduced, inasmuch as the arm D begins to travel along the lower arc of rotation, consequently the motion of the rocker arm 146, is reversed, that is, the lower end begins to move towards the right, see Fig. 4, and consequently the roller 153 clutches the wheel 135, and carries it to the right, thereby causing the rotation of the pinion 131 under the carriage B, thus moving the carriage B to the left, Fig. 1. It will be seen that this movement of the wheel 135 continues as long as the stroke of the arm 142 continues to the right. When the arm D, begins to travel along the upper arc, the motion of the arm 142 is reversed and therefore the roller 153 disengages from the wheel, concluding the forward step to the right of the carriage B. It is during this motion of the arm 142 from left to right that the knives have been traveling up and down during that portion of their cycle of operation above the stripping plates 155 and 156.

It will be understood that the reference to the two cycles of operation of the knives to the plates 155 and 156 is a rough approximation, as it will be understood that these plates 155 and 156 are adjustable. These plates are threaded and lock nuts being provided on these threads as shown at the top of Fig. 1, through the medium of which lock nuts the adjustment can be carried out. What we mean to make clear is the fact that by rotating the wheel 102, the knives are caused to operate up and down and at the same time the feed mechanism operates the wheel 135, step by step. The wheel 135 being operated once during one rotation of the shaft 106, and the knives being raised and lowered once during the same operation, the feed operation is regulated so that the carriage B is not moved while the knives are in the cutting stage of the operation. By continuing the rotation of the wheel 102, the carriage B is caused to advance step by step and between each advance of the carriage the knives which continue to operate up and down, engage the material on the carriage B, and cut off a section thereof. So that, by continuing the rotation of the wheel 102, the material on the carriage B can be cut up into a series of sections, all of the sections being of the same length.

However, we may here state, that at any stage of the operation, the adjustment of the nut 143 on the mechanism D, may be varied and from that point on the sections that are cut off by the knives would be of a different length from the sections cut off prior to such change; inasmuch as by changing the adjustment at the device D, the distance that the wheel 135 is rotated upon the forward oscillatory stroke of the arm 146 is varied. It will thus be seen that I provide in combination with a carriage a cutting tool for cutting material on the carriage and that I provide a feed mechanism, so interlocked with the knives and the carriage as to work in synchronism therewith. It will be seen further that the mechanism of this feed is such that the length of the sections into which the material may be cut may be varied to any extent between a maximum and minimum limit determined by the distance that the nut 143 is made eccentric with respect to the axis of rotation of a shaft 106. Further, it will be seen that these variations and the length of the cuts may be made without in any way changing either the carriage B or anything thereof, the one thing necessary to produce the change being the shifting of the nut 143 along the arm D.

The description thus far has assumed the step by step operation of the carriage B to take place to the right, Fig. 1, but the direction of the carriage B may be reversed and the step by step caused to take place to the left, Fig. 1, by reversing the bolt 148, (see Fig. 2) and throwing it to right into the position shown by the dotted lines. This has the effect of shifting the roller 153 as already explained into the position indicated by the dotted lines, Fig. 4. It is obvious that by thus reversing the position of the roller 153, the direction of rotation of the wheel 135 as a result of the reciprocating movement of the arm 142, will be reversed. In other words, referring to Fig. 4, the wheel 135 will now be caused to rotate every time that the arm 146 moves to the left instead of to the right as in the preceding description. Your attention is called to the following fact, that continuing to rotate the wheel 102, in a counter clock-wise direction, Fig. 1, (clock-wise direction, Fig. 6), the reversal of the roller 153 will cause the operation of the carriage B, to take place while the knives are in the lower cycle of their operation. This, of course, must not be. In order to maintain the condition that will produce the stepping action of the carriage B while the knives are in the upper section of their cycle of operation, the rotation of the wheel 102 must be reversed at the same time that the bolt 148 is reversed. By so reversing the rotation of the wheel 102, the clutch mechanism, Fig. 4 will still continue to operate to rotate the wheel 135 while the arm D is rotating along the lower half of the arc of rotation and while it is passing rotating in a clock-wise direction, which is a direction in the reverse of the direction previously described while the roller 153 was on the left, Fig. 4. In other words, in order to maintain the proper relation between the stepping action of the carriage B, and the knives, the clutch, Fig. 4, must operate while the arm D, is passing through the lower half of its revolution. When the pin is at the left, Fig. 4, the revolution must be in a counter clock-wise direction, Fig. 1, and when the pin is on the right, Fig. 4, revolution must be in a clockwise direction.

Heretofore, in machines of the prior art, the material to be cut is loaded on a carriage at some loading point away from the machine. The carriage with its load is then slipped into position on the top of the frame work, and the cutting operation conducted while the carriage is moving in one direction on the right, Fig. 1, we will say. The carriage with its cut material is then removed as a whole and a new carriage with a new load is brought in and in turn slipped into position on the framework and the cutting conducted when the carriage is moving to the right. This continuous operation is never changed or reversed, except that when the material is to be cut into sections of different lengths, carriages of different type are supplied. These carriages being constructed with rack teeth of different pitch, depend upon the length of the sections into which the material is to be cut. In these machines it is not possible to cut on the same carriage, sections of different length.

In a machine of my invention, the same carriage is always used. A section of material can be cut into similar sections of various lengths by merely changing the feed. On the top of the carriage of my machine, I provide a plate or board 157. This board is merely set on top of the carriage B, and held in place by wings 158 and 159, on the heads 160 and 161 of the carriage. As shown in Fig. 6, between the board 157 and the head 161. I provide a cleat 162 which is inserted in place to prevent the board 157 from sliding on the carriage. The plate 157 is shown in the drawing as being shorter than the carriage and for this reason the cleat 162 is supplied.

The object in this arrangement is to enable the machine to be used to cut the material on the plate 157, into sections from one end to the other, without leaving an uncut portion, which might have had to be done to prevent the rack on the underside of the carriage B, from running off of the pinion 131. However, the necessity of the cleat 162 may be avoided by making the rack under the carriage long enough or by making the heads 160 and 161 adjustable on the carriage B. In other words, the heads 160 and 161, may be provided with an angled section through which a bolt may pass, the head of which bolt may be made to slide along the base of the carriage until the required distance between the heads is obtained, at which point they may be locked, in order to permit the cross cutting knife to cut close to the heads 160 and 161. These heads as shown in Fig. 11, are provided with slots 163 through which the longitudinal knives 118 and 119 may project. Of course when more than one longitudinal knife is provided, a suitable number of slots 163 will have to be provided.

Referring to Figs. 1 and 6, it will be seen that on the lower terminals of the rods 121 and 122, there are threads and on these threads there are nuts on either side of the bearings 124 and 126. This construction is for the purpose of enabling the knives to be adjusted with respect to the carriage B. On the legs of the frame A, underneath the mechanism, I provide a trough 164 for catching any drippings from the machinery or from the carriage.

Referring to Fig. 5, I show here a modified form of the clutch mechanism wherein in place of the roller 153, I provide a wedge shaped block 165 which serves the same purpose as the roller 153.

With respect to the reversing mechanism for the clutch device (see Fig. 2), I construct the stirrup 151 so that the difference of the throw and the roller 153 to either side of the center line or neutral point is the same. Otherwise after a given adjustment of the feed mechanism D, the length of the sections of the material cut off by the knives will vary when the carriage B is travelling in different directions.

In the foregoing, I have described how the carriage B, may be moved between the cutting portions of the knives, either to the right or to the left. I wish to explain that the carriage B can be adjusted before the cutting operations begin. For this purpose I provide the hand wheel 134 on the shaft 133. When the plate 157 loaded with material to be cut is deposited on the carriage, it is necessary that the carriage be adjusted to the proper starting point. This may be done by throwing the bolt 148 into neutral position, that is, into position half way between positions shown in Fig. 2, and in this position of the bolt 148 the clutch roller 153 stands in neutral position half way between the two positions shown in Fig. 4, and out of engagement of the lower surface 145 of the rocker-arm 136. In this position of the clutch mechanism, the carriage B may be moved by the wheel 134 without operating the feed mechanism; consequently the carriage B may be set to the desired point and the feed mechanism thrown in thereafter.

What I claim as my invention is:

1. In a machine for dividing a block of plastic material such as ice cream into equally divided portions, a frame, a carriage for supporting the material adapted to move on the frame longitudinally thereof, a cutting tool having a transversely extending knife disposed over the carriage, a pair of upright supports, extending from the frame on the two sides of the carriage, said knife journalled on the supports for vertical reciprocation, common driving means for the carriage and the cutting tool, a rack disposed longitudinally of the carriage and carried thereby, a pinion journalled in the frame engageable with the rack, means to effect a step by step rotary movement of the pinion comprising a link and a step by step ratcheting mechanism interposed between the pinion and the driving means, a reciprocable link joining said driving means to said cutting tool, said link being so disposed as to effect a longitudinal movement of the carriage simultaneously with an upward movement of said cutting tool, said ratcheting mechanism comprising a wheel in driving relation to said pinion, an arm journalled co-axially with the wheel and a pawl swivelably carried adjacent the end portion of the arm, radially of the wheel, said pawl comprising a block making an eccentric wedging contact with the wheel when the arm is moved on its axis in a given direction and swiveling freely when moved in the opposite direction.

2. In a machine for dividing a block of plastic material such as ice cream into equally divided portions, a frame, a carriage for supporting the material adapted to move on the frame longitudinally thereof, a cutting tool having a transversely extending knife disposed over the carriage, a pair of upright supports, extending from the frame on the two sides of the carriage, said knife journalled on the supports for vertical reciprocation, common driving means for the carriage and the cutting tool, a rack disposed longitudinally of the carriage and carried thereby, a pinion journalled in the frame engageable with the rack, means to effect a step by step rotary movement of the pinion comprising a link and a step by step ratcheting mechanism interposed between the pinion and the driving means, a reciprocable link joining said driving means to said cutting tool, said link being so disposed as to effect a longitudinal movement of the carriage simultaneously with an upward movement of said cutting tool, said ratcheting mechanism comprising a wheel in driving relation to said pinion, an arm journalled co-axially with the wheel and a pawl swivelably carried adjacent the end portion of the arm, radially of the wheel, said pawl comprising a block making an eccentric wedging contact with the wheel when the arm is moved on its axis in a given direction and swiveling freely when moved in the opposite direction, means comprising an adjustment screw for tilting the block so that its point of engagement with the wheel is disposed to the one or the other side of a radius of the wheel passing through its swivelling axis.

3. In a machine for dividing a block of plastic material such as ice cream into equally divided portions, a frame, a carriage for supporting the material adapted to move on the frame longitudinally thereof, a cutting tool having a transversely extending knife disposed over the carriage, a pair of upright supports, extending from the frame on the two sides of the carriage, said knife journalled on the supports for vertical reciprocation, common driving means for the carriage and the cutting tool, a rack disposed longitudinally of the carriage and carried thereby, a pinion journalled in the frame engageable with the rack, means to effect a step by step rotary movement of the pinion comprising a link and a step by step ratcheting mechanism interposed between the pinion and the driving means, a reciprocable link joining said driving means to said cutting tool, said link being so disposed as to effect a longitudinal movement of the carriage simultaneously with an upward movement of said cutting tool, said ratcheting mechanism comprising a wheel disposed in driving relation to said pinion, an arm having a portion adjacent the wheel rim, said arm comprising a pair of bevelled surfaces facing the wheel rim and a pawl element disposed intermediate the surfaces and the rim and making wedging engagement therebetween upon a predetermined reciprocatory movement of the arm to clutch the arm to the wheel.

4. In a machine for sub-dividing elongated blocks of plastic material into equal portions, comprising a frame, a carriage for supporting the material, supported by the frame and movable longitudinally thereof, a cutting tool having a transversely extending knife disposed over the carriage, reciprocable means supporting the cutting tool, continuously operating common driving means for longitudinally moving the carriage and effecting reciprocatory movement of the reciprocable means, means to effect a step by step longitudinal movement of the carriage on the frame comprising a step by step ratcheting mechanism interposed between said driving means and the carriage, said ratcheting mechanism comprising a rotatable element for advancing the carriage and a substantially coaxially movable reciprocating member, said rotatable element and said member each formed to have opposite surface portions forming opposing converging walls of a wedge channel, and a rolling wedging element disposed in the channel and engageable with the said walls of the said rotatable element and of the said member, means adapted to effect communication of a reciprocating movement from said common driving means through an arm to said member, said wedging element adapted upon alternate reciprocating movements of the member to effect wedging motion-communicating engagement with the converging channel wall surfaces of said rotatable element and said member to effect intermittent driving to rotate the rotatable element.

5. In a machine for sub-dividing elongated blocks of plastic material into equal portions, comprising a frame, a carriage for supporting the material, supported by the frame and movable longitudinally thereof, a cutting tool having a transversely extending knife disposed over the carriage, reciprocable means supporting the cutting tool, continuously operating common driving means for longitudinally moving the carriage and effecting reciprocatory movement of the reciprocable means, means to effect a step by step longitudinal movement of the carriage on the frame comprising a step by step ratcheting mechanism interposed between said driving means and the carriage, said ratcheting mechanism comprising a rotatable element for advancing the carriage and a substantially coaxially movable reciprocating member, said rotatable element and said member each formed to have opposite surface portions forming opposing converging walls of a wedge channel, extending in opposite directions from an intermediate point, and a rolling wedging element disposed in the channel and engageable with the said walls of the said rotatable element and of the said member, means adapted to effect communication of a reciprocating movement from said common driving means through an arm to said member, said wedging element adapted upon alternate reciprocating movements of the member to effect wedging motion-communicating engagement with the converging channel wall surfaces of said rotatable element and said member to effect intermittent driving to rotate the rotatable element.

6. In a machine for sub-dividing elongated blocks of plastic material into equal portions, comprising a frame, a carriage for supporting the material, supported by the frame and movable longitudinally thereof, a cutting tool having a transversely extending knife disposed over the carriage, reciprocable means supporting the cutting tool, continuously operating common driving means for longitudinally moving the carriage and effecting reciprocatory movement of the reciprocable means, means to effect a step by step longitudinal movement of the carriage on the frame comprising a step by step ratcheting mechanism interposed between said driving means and the carriage, said ratcheting mechanism comprising a rotatable element for advancing the carriage and a substantially coaxially movable reciprocating member, said rotatable element and said member each formed to have opposite surface portions forming opposing converging walls of a wedge channel, extending in opposite directions from an intermediate point, and a rolling wedging element disposed in the channel and engageable with the said walls of the said rotatable element and of the said member, means adapted to effect communication of a reciprocating movement from said common driving means through an arm to said member, said wedging element adapted upon alternate reciprocating movements of the member to effect wedging motion-communicating engagement with the converging channel wall surfaces of said rotatable element and said member to effect intermittent driving to rotate the rotatable element, means to adjustably variably shift the angular positions of said member and said rotating element to reverse said ratcheting mechanism.

7. In a machine for dividing a block of plastic material such as ice cream into equally divided portions, a frame, a carriage for supporting the material adapted to move on the frame longitudinally thereof, a cutting tool having a transversely extending knife disposed over the carriage, said knife mounted for vertical reciprocation through the ice cream from a point above the ice cream, common driving means for the carriage and the cutting tool, a rack disposed longitudinally of the carriage and carried thereby, a pinion journalled in the frame engageable with the rack, means to effect a step by step rotary movement of the pinion comprising a link and a step by step ratcheting mechanism interposed between the pinion and the driving means, a reciprocable link joining said driving means to said cutting tool, said link being so disposed as to effect a longitudinal movement of the carriage simultaneously with an upward movement of said cutting tool, said ratcheting mechanism comprising a wheel disposed in driving relation to said pinion, an arm having a portion adjacent the wheel rim, said arm comprising a pair of bevelled surfaces facing the wheel rim and a pawl element disposed intermediate the surfaces and the rim and making wedging engagement therebetween upon a predetermined reciprocatory movement of the arm to clutch the arm to the wheel.

8. In a machine for sub-dividing elongated blocks of plastic material into equal portions, comprising a frame, a carriage for supporting the material, supported by the frame and movable longitudinally thereof, a cutting tool having a transversely extending knife disposed over the carriage, reciprocable means supporting the cutting tool, continuously operating common driving means for longitudinally moving the carriage and effecting reciprocatory movement of the reciprocable means, means to effect a step by step longitudinal movement of the carriage on the frame comprising a step by step ratcheting mechanism interposed between said driving means and the carriage, said ratcheting mechanism comprising a rotatable element for advancing the carriage and a substantially coaxially movable reciprocating member, said rotatable element and said member each formed to have opposite surface portions forming opposing converging walls of a wedge channel, and a roller pocketed between the said rotatable element and the said reciprocable member, in the channel and engageable with the said walls of the said rotatable element and of the said member, means adapted to effect communication of a reciprocating movement from said common driving means through an arm to said member, said wedging element adapted upon alternate reciprocating movements of the member to effect wedging motion-communicating engagement with the converging channel wall surfaces of said rotatable element and said member to effect intermittent driving to rotate the rotatable element.

9. In a machine for sub-dividing elongated blocks of plastic material into equal portions, comprising a frame, a carriage for supporting the material, supported by the frame and movable longitudinally thereof, a cutting tool having a transversely extending knife disposed over the carriage, reciprocable means supporting the cutting tool, continuously operating common driving means for longitudinally moving the carriage and effecting reciprocatory movement of the reciprocable means, means to effect a step by step longitudinal movement of the carriage on the frame comprising a step by step ratcheting mechanism interposed between said driving means and the carriage, said ratcheting mechanism comprising a rotatable element for advancing the carriage and a substantially coaxially movable reciprocating member, said rotatable element and said member each formed to have opposite surface portions forming opposing walls of a wedge channel, and a roller pocketed between the said rotatable element and the said reciprocable member, the pocket being formed by the converging walls of the member and element, said roller being in the channel and engageable with the said walls of the said rotatable element and of the said member, means adapted to effect communication of a reciprocating movement from said common driving means through an arm to said member, said wedging element adapted upon alternate reciprocating movements of the member to effect wedging motion-communicating engagement with the converging channel wall surfaces of said rotatable element and said member to effect intermittent driving to rotate the rotatable element.

10. In a machine for dividing a block of plastic material such as ice cream into equally divided portions, a frame, a carriage for supporting the material adapted to move on the frame longitudinally thereof, a cutting tool having a transversely extended knife disposed over the carriage, said knife being mounted for vertical reciprocation through the ice cream from a point above the ice cream, common driving means for the carriage and the cutting tool, a ratcheting mechanism to effect a step by step movement of the carriage, connections between the common driving means and the carriage and tool for effecting movement of the carriage simultaneously with an upward movement of the cutting tool, said ratcheting mechanism comprising a wheel having driving relation to the carriage, an arm having a portion adjacent to the wheel rim, said arm comprising a beveled surface facing the wheel rim and a pawl element disposed intermediate the beveled surface and the rim and making wedging engagement therebetween upon a predetermined reciprocating movement of the arm in one direction to clutch the arm to the wheel, and in the other direction releasing the clutch and means for reciprocating the arm.

11. In a machine for dividing a block of plastic material such as ice cream into equally divided portions, a frame, a carriage for supporting the material adapted to move on the frame longitudinally thereof, a cutting tool having a transversely extended knife disposed over the carriage, said knife being mounted for vertical reciprocation through the ice cream from a point above the ice cream, common driving means for the carriage and the cutting tool, a ratcheting mechanism to effect a step by step movement of the carriage, connections between the common driving means and the carriage and tool for effecting movement of the carriage simultaneously with an upward movement of the cutting tool, said ratcheting mechanism comprising a wheel having driving relation to the carriage, an arm having a portion adjacent to the wheel rim, said arm comprising a beveled surface facing the wheel rim and a pawl element disposed intermediate the beveled surface and the rim and making wedging engagement therebetween upon a predetermined reciprocating movement of the arm in one direction to clutch the arm to the wheel, and in the other direction releasing the clutch and means for reciprocating the arm, said means including a rotary crank pin, a connecting link between the pin and the said arm and means to adjustably vary the reciprocatory movement of said arm, said reciprocatory adjusting means comprising a radial guide for the pin, a traveling nut connected with the pin and a stationary screw for moving the nut.

In witness whereof, I have hereunto signed my name this 10th day of October, 1922.

WILLIAM E. KAY.